(12) United States Patent
Park et al.

(10) Patent No.: US 9,037,979 B2
(45) Date of Patent: May 19, 2015

(54) SYSTEM, METHOD AND APPARATUS OF PROVIDING/RECEIVING SERVICE OF PLURALITY OF CONTENT PROVIDERS AND CLIENT

(75) Inventors: Taejin Park, Seoul (KR); Yongki Lee, Seoul (KR); Sucheol Ha, Seoul (KR); Hojin Song, Seoul (KR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 13/287,748

(22) Filed: Nov. 2, 2011

(65) Prior Publication Data
US 2012/0131447 A1 May 24, 2012

Related U.S. Application Data

(60) Provisional application No. 61/417,015, filed on Nov. 24, 2010.

(30) Foreign Application Priority Data

Nov. 23, 2010 (KR) .................. 10-2010-0117157
Jun. 8, 2011 (KR) .................. 10-2011-0055345

(51) Int. Cl.
*G06F 3/00* (2006.01)
*H04N 21/8543* (2011.01)
(52) U.S. Cl.
CPC .................. *H04N 21/8543* (2013.01)
(58) Field of Classification Search
CPC .................................................. G06F 17/211
USPC ......................................................... 715/239
See application file for complete search history.

(56) References Cited

U.S. PATENT DOCUMENTS

| | | | | |
|---|---|---|---|---|
| 6,973,618 | B2 * | 12/2005 | Shaughnessy et al. | 715/239 |
| 7,181,693 | B1 * | 2/2007 | Anderson et al. | 715/745 |
| 7,565,640 | B2 * | 7/2009 | Shukla et al. | 717/105 |
| 7,631,260 | B1 * | 12/2009 | Riggs et al. | 715/716 |
| 7,631,330 | B1 | 12/2009 | Des Jardins | |
| 7,802,185 | B1 * | 9/2010 | Cooper et al. | 715/276 |
| 7,853,884 | B2 * | 12/2010 | Olander et al. | 715/744 |
| 8,209,608 | B1 * | 6/2012 | Linyard et al. | 715/716 |
| 8,244,796 | B1 * | 8/2012 | James et al. | 709/203 |
| 8,291,313 | B1 * | 10/2012 | Monikandan | 715/244 |
| 2002/0026462 | A1 * | 2/2002 | Shotton et al. | 707/523 |
| 2003/0009433 | A1 * | 1/2003 | Murren et al. | 707/1 |
| 2004/0135805 | A1 * | 7/2004 | Gottsacker et al. | 345/751 |
| 2005/0050002 | A1 * | 3/2005 | Slotznick | 707/1 |
| 2006/0031880 | A1 | 2/2006 | Stark et al. | |
| 2006/0229882 | A1 * | 10/2006 | Stemmle et al. | 704/277 |
| 2006/0242608 | A1 * | 10/2006 | Garside et al. | 715/864 |
| 2007/0162843 | A1 * | 7/2007 | Ticknor | 715/513 |
| 2007/0168367 | A1 * | 7/2007 | Dickinson et al. | 707/100 |
| 2008/0043256 | A1 * | 2/2008 | Broda et al. | 358/1.3 |

(Continued)

FOREIGN PATENT DOCUMENTS

KR  10-2006-0126717 A  12/2006

*Primary Examiner* — Cesar Paula
*Assistant Examiner* — Mohammad-Ibrahim Zuberi
(74) *Attorney, Agent, or Firm* — Birch, Stewart, Kolasch & Birch, LLP

(57) ABSTRACT

A service providing method providing at least one of service provided from a plurality of contents provider to clients includes receiving metadata related to at least one of service provided from the contents provider; converting the received metadata into the metadata of XML format; and providing the metadata of the XML format to the clients.

6 Claims, 16 Drawing Sheets

(56) References Cited

U.S. PATENT DOCUMENTS

| | | |
|---|---|---|
| 2008/0052396 A1* | 2/2008 | Tell et al. ............... 709/226 |
| 2008/0154889 A1 | 6/2008 | Pfeiffer |
| 2008/0207137 A1 | 8/2008 | Maharajh et al. |
| 2008/0297521 A1* | 12/2008 | Chi et al. ............... 345/501 |
| 2009/0019061 A1* | 1/2009 | Scannell, Jr. ............... 707/10 |
| 2009/0172544 A1 | 7/2009 | Tsui et al. |
| 2010/0031193 A1 | 2/2010 | Stark et al. |
| 2010/0313235 A1* | 12/2010 | Straub ............... 725/131 |
| 2012/0131447 A1* | 5/2012 | Park et al. ............... 715/239 |

* cited by examiner

FIG.15
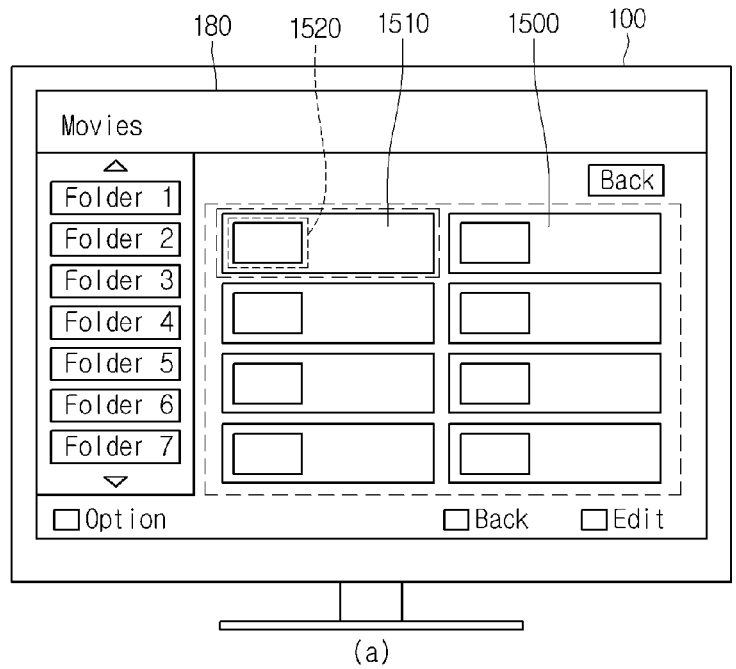
(a)
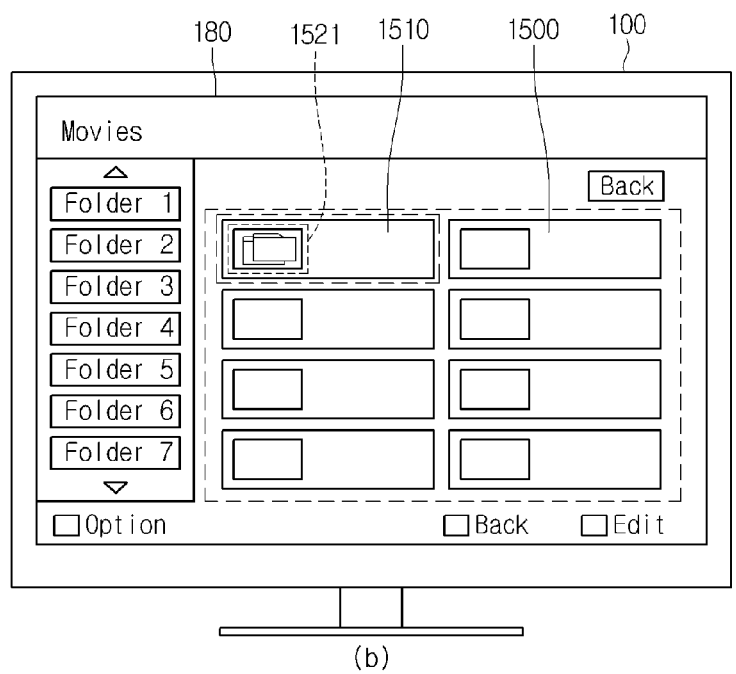
(b)

FIG.16
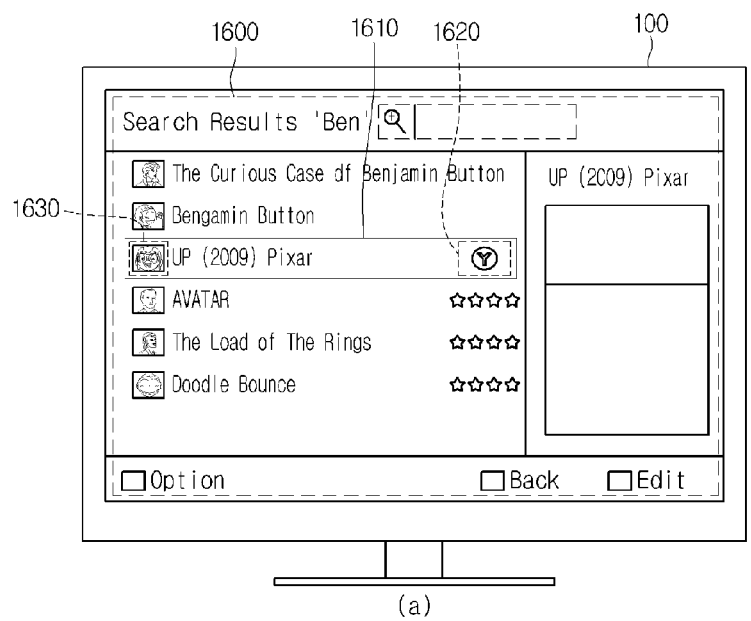
(a)
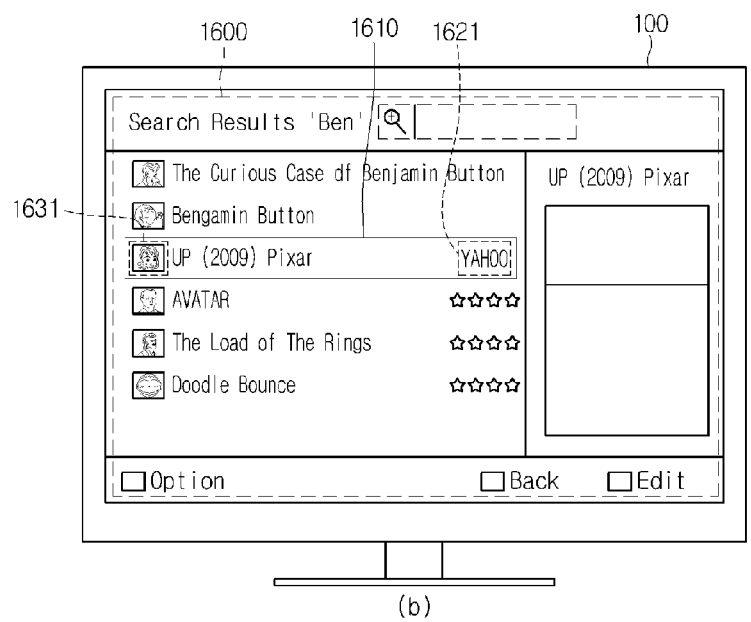
(b)

FIG.17
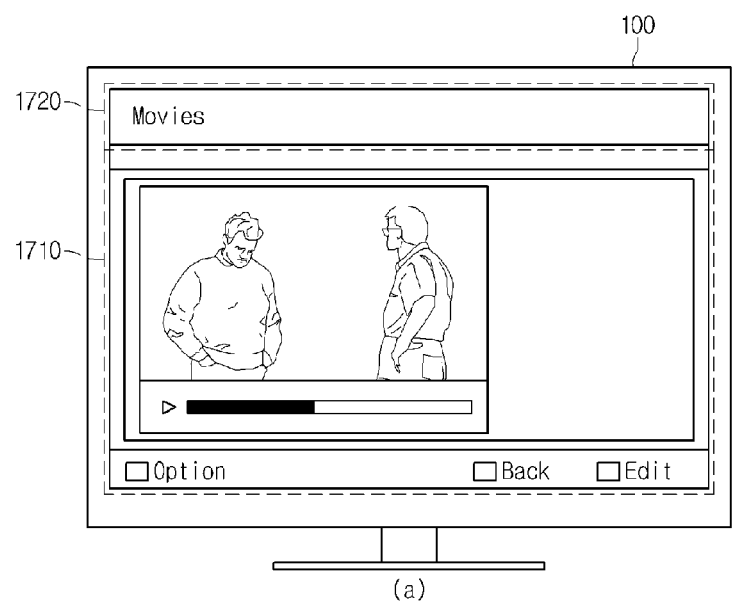
(a)
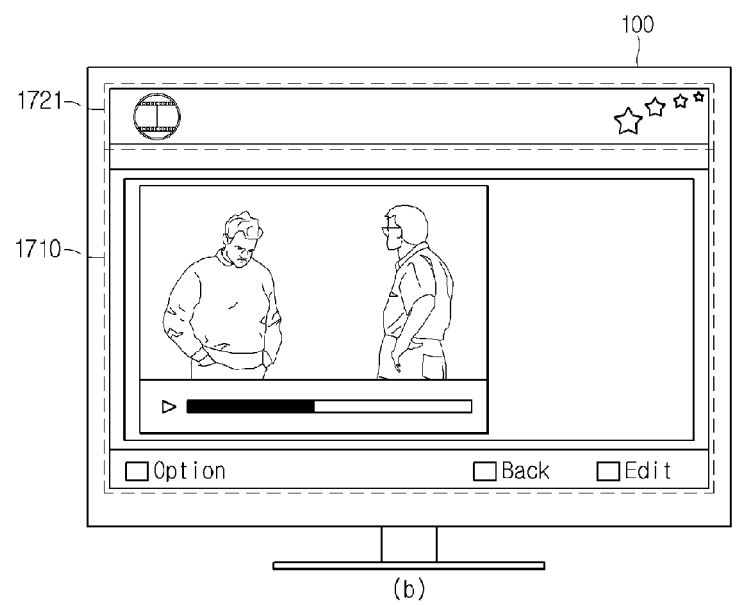
(b)

SYSTEM, METHOD AND APPARATUS OF PROVIDING/RECEIVING SERVICE OF PLURALITY OF CONTENT PROVIDERS AND CLIENT

CROSS REFERENCE TO RELATED APPLICATIONS

This nonprovisional application claims the benefit of U.S. Provisional Application No. 61/417,015 filed on Nov. 24, 2010 and to Patent Application No. 10-2010-0117157 filed in the Republic of Korea, on Nov. 23, 2010 and to Patent Application No. 10-2011-0055345 filed in the Republic of Korea, on Jun. 8, 2011. The entire content of all of the above applications is hereby incorporated by reference.

BACKGROUND OF THE INVENTION

1. Technical Field

The present invention relates to a system, a method and an apparatus of providing/receiving service of plurality of content providers and client.

2. Description of the Related Art

Recently, a digital TV service using a wired or wireless network is becoming more common. The digital TV service may provide various services that may not provide by the exist analog broadcast service.

For example, a type of digital service, that is, IPTV (Internet Protocol Television) service provides a interactivity by which the user may actively select the type of programs, viewing time, etc. The IPTV service may provide various value-added services, for example, Internet search, home shopping, online games, etc. based on the interactivity.

SUMMARY OF THE INVENTION

The present invention relates to a system, a method and an apparatus of providing/receiving service of plurality of content providers and client, and in more detail, an advantage of some aspects of the invention is that it provides a system, a method and an apparatus of providing/receiving service of plurality of content providers and client in which the service provider may search the service more easily using metadata provided from the contents provider.

According to an aspect of the invention, there is provided a service providing method providing at least one of service provided from a plurality of contents provider to clients, including receiving metadata related to at least one of service provided from the contents provider; converting the received metadata into the metadata of XML format; and providing the metadata of the XML format to the clients.

Meanwhile, according to another aspect of the invention, there is provided a service receiving method receiving the service from outside server, including receiving the metadata of the XML format from the contents provider; producing a first UI skin representing any one of the service provided from the plurality of contents provider based on the metadata of the received XML format; and displaying the produced first UI skin on the display.

Meanwhile, according to another aspect of the invention, there is provided a client receiving the service from outside server, including a display; a network interface receiving the metadata of the XML format from the service provider; and a controller producing a first UI skin representing any one of the service provided from a plurality of contents providers based on the metadata of the received XML format, and controlling to display the produced first UI skin on the display.

BRIEF DESCRIPTION OF THE DRAWINGS

FIGS. 15A and 15B, 16A and 16B, and 17A and 17B show an example of the screen displaying UI skin produced using metadata in the service providing system according to another embodiment of the invention.

DESCRIPTION OF THE PREFERRED EMBODIMENTS

Hereinafter, a network service providing method and a display apparatus using the same will be described in detail with reference to attached drawings.

The display apparatus according to an embodiment of the invention, for example, which is an intelligent display apparatus adding computer supporting function to broadcasting receiving function, may include interface more convenient in use than handwriting input devices, touch screen or space remote controller and the like by adding Internet function while devoting to the broadcasting receiving function. Further, the display apparatus is connected to the Internet and the computer with the support of wired or wireless Internet function to perform functions such as email, web browsing, banking or game and the like, too. A standardized general-purpose OS may be use for such a various function.

Accordingly, the display apparatus described in the invention may perform user-friendly functions by, for example, freely adding or deleting various applications on a general-purpose OS kernel. The display apparatus may become in more detail, for example, network TV, HBBTV, smart TV and the like and in some cases may be applied to smartphones.

Furthermore, although the embodiments of the invention are described in detail with respect to the attached drawings and the contents written in the attached drawings, and the invention is not limited to the embodiments.

The terms used in the present specification selects now widely available general terms while considering the functions at the invention, but which may be varied depending on intention of one skilled in the art, practice or the emergence of new technologies and the like. Further, terms randomly selected by the applicants may also be present in specific cases, and in this case, the meaning thereof will be written in the description of the invention. Therefore, the terms used in this specification should be interpreted based on substantive meaning of the terms and the contents of this specification than the mere designation of terms.

Figure 1:
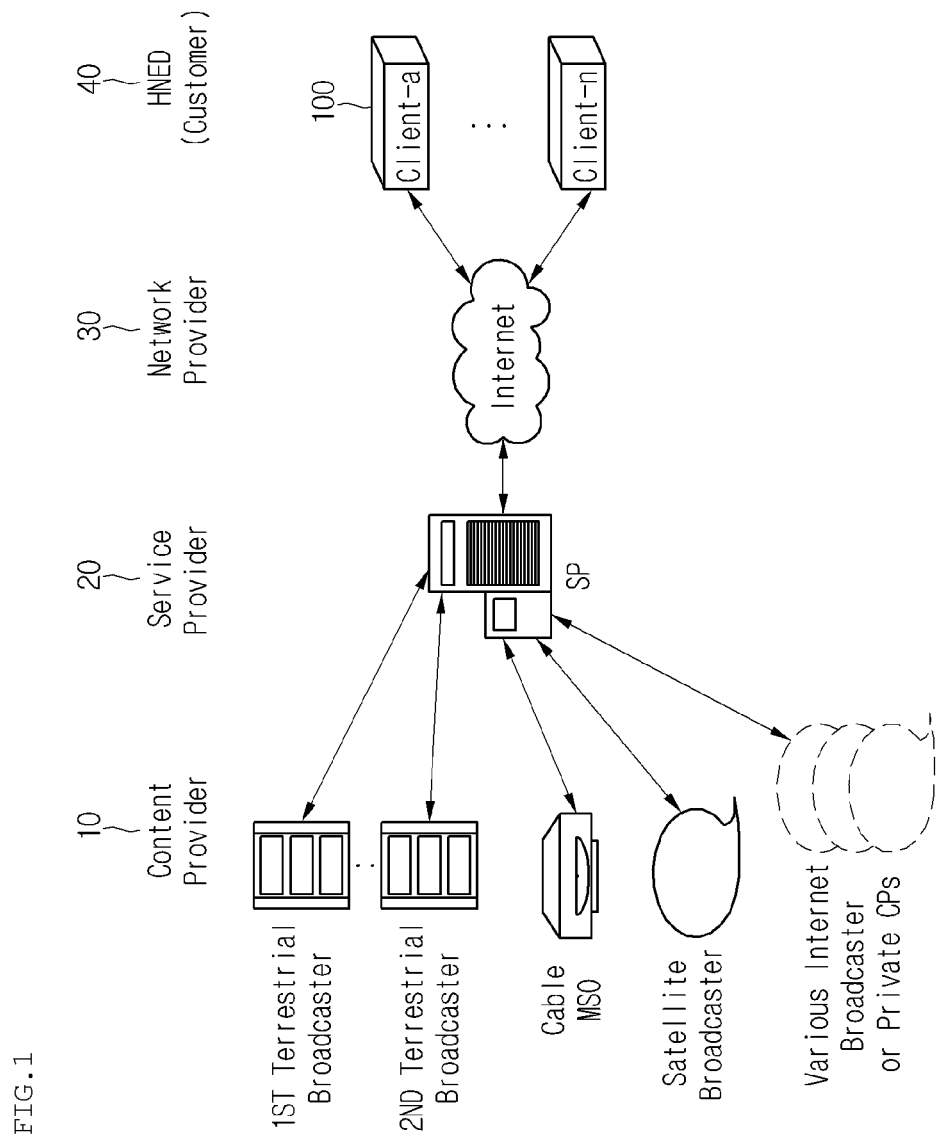
FIG. 1 schematically shows an embodiment for configuration of a broadcasting system.

FIG. 1 illustrates the overall configuration of a broadcasting system including a display apparatus according to an embodiment of the present invention.

Referring to FIG. 1, the broadcasting system may include a Content Provider (CP) 10, a Service Provider (SP) 20, a Network Provider (NP) 30, and a Home Network End Device (HNED) 40.

The HNED 40 corresponds to, for example, a client 100 which is a display apparatus according to an embodiment of the present invention. As stated before, the display apparatus may be a network TV, a smart TV, an Internet Protocol TV (IPTV), etc.

The CP 10 creates and provides content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 in a service package. For instance, the SP 20 may package first terrestrial broadcasting, second terrestrial broadcasting, cable broadcasting, satellite broadcasting, Internet broadcasting, and applications and provide the package to users.

The SP 20 may unicast or multicast a service to the client 100. Unicast is a form of transmission in which information is sent from only one transmitter to only one receiver.

In other words, the unicast transmission is point-to-point, involving two nodes only. In an example of the unicast transmission, upon receipt of a request for data from a receiver, a server transmits the data to only one receiver.

The multicast transmission is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
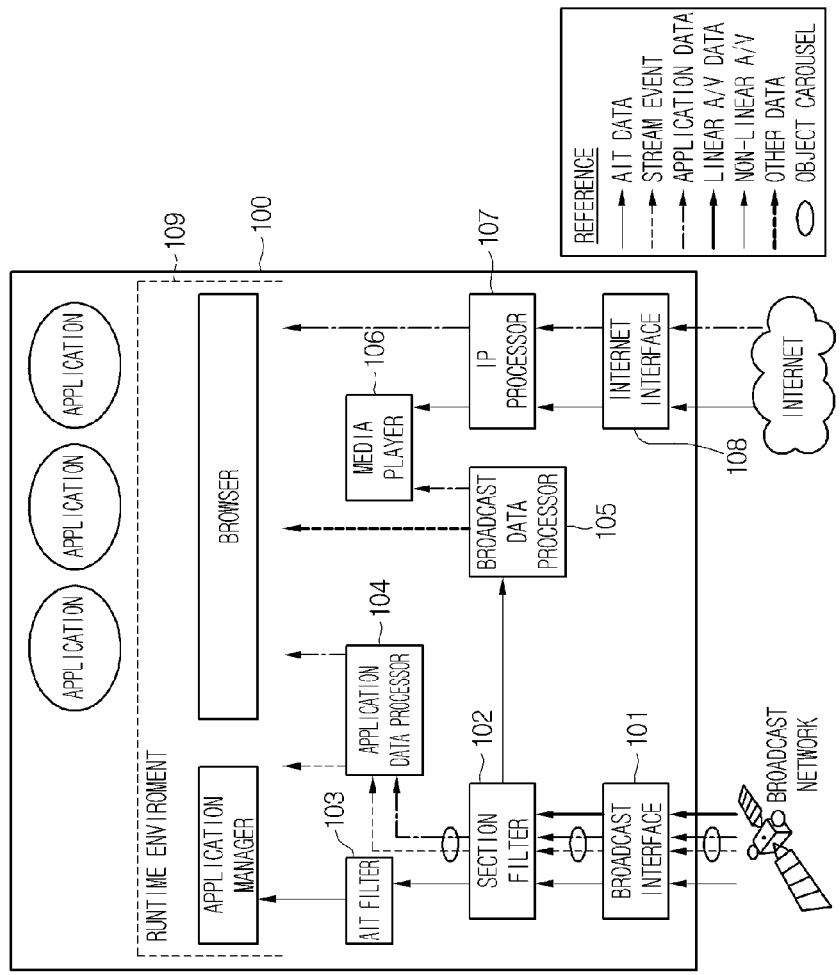
FIG. 2 shows another embodiment for configuration of a broadcasting system.

Referring to FIG. 2, the display apparatus 100 that corresponds to a client of FIG. 1 is connected to a broadcast network and the Internet.

The display apparatus 100 includes, for example, a broadcast interface 101, a section filter 102, an Application Information Table (AIT) filter 103, an application data processor 104, a broadcast data processor 105, a media player 106, an IP processor 107, an Internet interface 108, and a runtime module 109.

The display apparatus 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 105, and the stream events and application data to the application data processor 104.

Meanwhile, the display apparatus 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
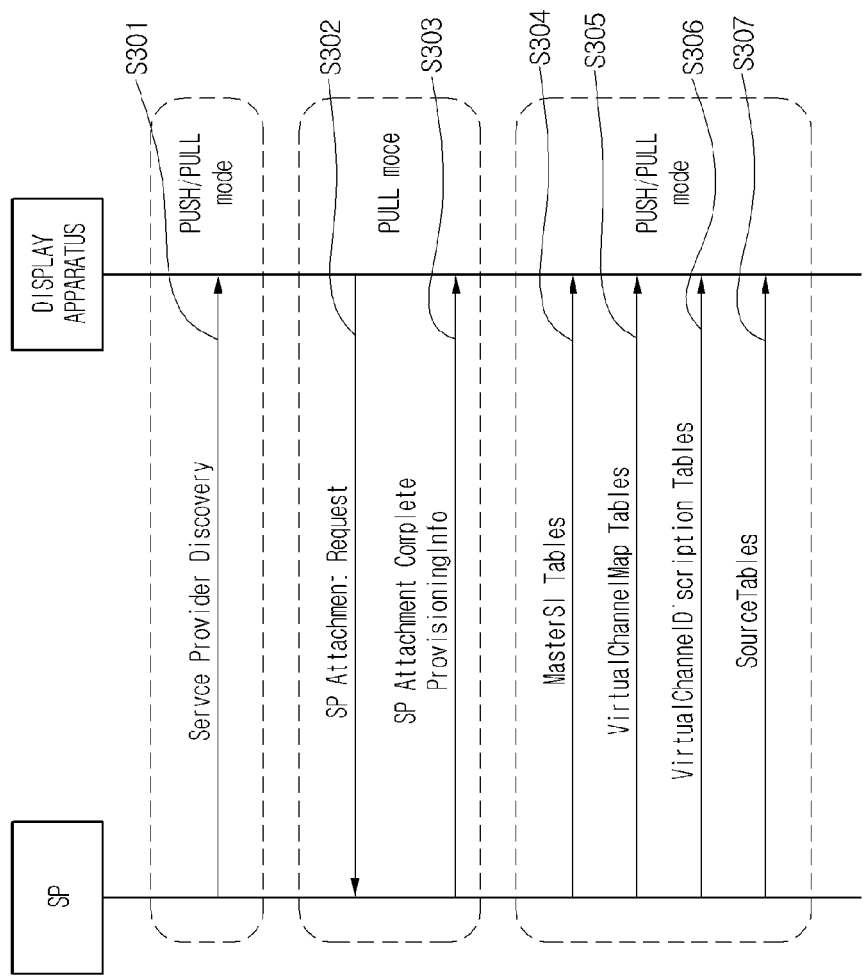
FIG. 3 shows an embodiment for a data transmitting and receiving method between a display apparatus and a service provider.

FIG. 3 is a diagram illustrating a signal flow for an operation for attaching to an SP and receiving channel information from the SP in the display apparatus.

Referring to FIG. 3, an SP performs an SP Discovery operation (S301) and the display apparatus transmits a Service Provider Attachment Request signal to the SP (S302). Upon completion of attachment to the SP, the display apparatus receives provisioning information from the SP (S303). Further, the display apparatus receives Master System Information (SI) Tables, Virtual Channel Map Tables, Virtual Channel Description Tables, and Source Tables from the SP (S304 to S307).

For example, SP Discovery is a process by which SPs that provide IPTV services search for Service Discovery (SD) servers having information about the offerings of the SPs.

In order to receive information about the SD servers, an SD server address list can be detected, for example, using three methods, specifically use of an address preset in the display apparatus or an address manually set by a user, Dynamic Host Configuration Protocol (DHCP)-based SP Discovery, and Domain Name System Service (DNS SRV)-based SP Discovery.

The display apparatus accesses a specific SD server using the SD server address list obtained through one of the above three methods and receives a SP Discovery record from the specific SD server. The Service Provider Discovery record includes information needed to perform Service Discovery on an SP basis.

The display apparatus then starts a Service Discovery operation using the SP Discovery record. These operations can be performed in a push mode or a pull mode.

The display apparatus accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the display apparatus may perform a service authentication procedure.

After service attachment is successfully performed, a server may transmit data in the form of a provision information table to the display apparatus.

During service attachment, the display apparatus may include an Identifier (ID) and location information thereof in data and transmit the data to the service attachment server. Thus the service attachment server may specify a service that the display apparatus has subscribed to based on the ID and location information.

In addition, the service attachment server provides, in the form of a provisioning information table, address information from which the display apparatus can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
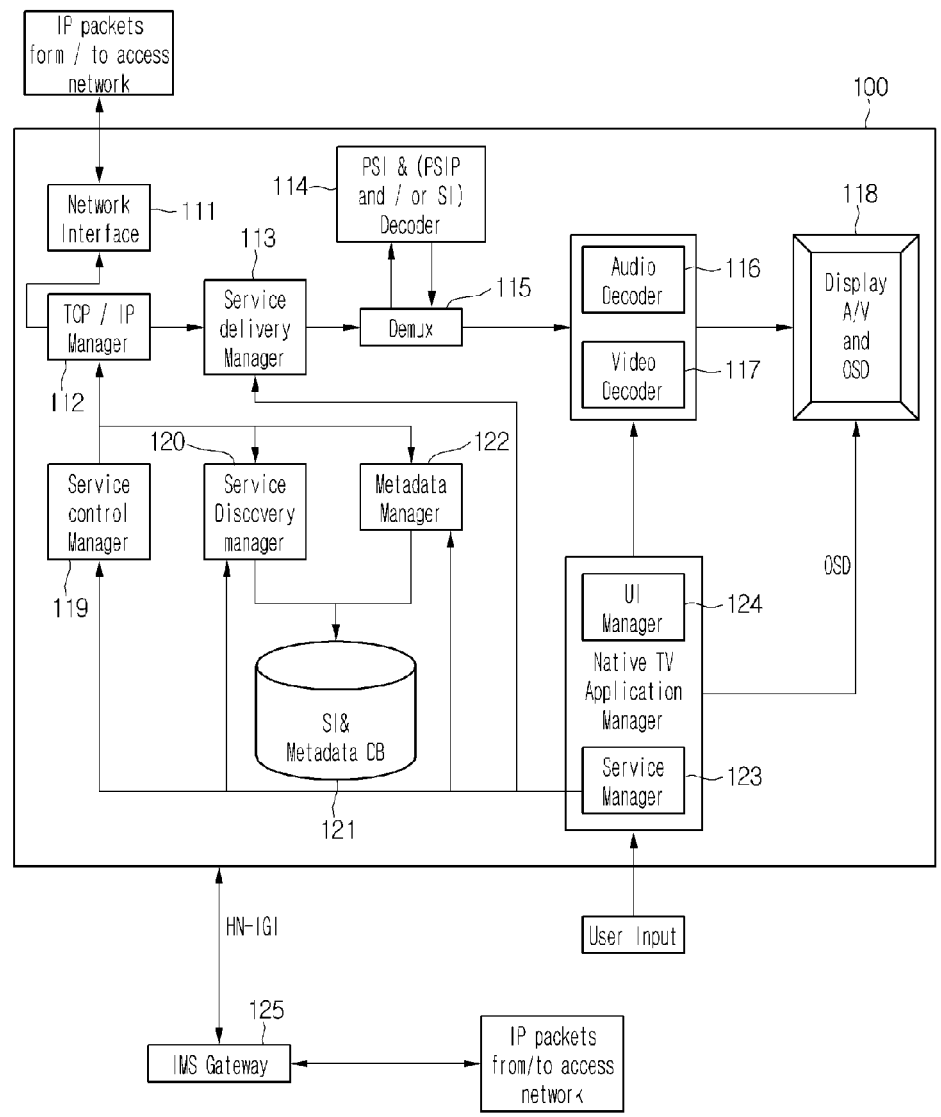
FIG. 4 is a block view showing configuration of the display apparatus according to an exemplary embodiment of the invention.

FIG. 4 is a detailed block diagram of the display apparatus according to an embodiment of the present invention.

Referring to FIG. 4, a display apparatus 100 includes a network interface 111, a Transmission Control Protocol/Internet Protocol (TCP/IP) manager 112, a service delivery manager 113, a Demultiplexer (DEMUX) 115, a Program Specific Information (PSI) & (Program and System Information Protocol (PSIP) and/or SI) decoder 114, a display A/V and On Screen Display (OSD) module 118, a service control manager 119, a service discovery manager 120, a metadata manager 122, an SI & metadata DataBase (DB) 121, a User Interface (UI) manager 124, and a service manager 123.

The network interface 111 transmits packets to and receives packets from a network. Specifically, the network interface 111 receives services and content from an SP over the network.

The TCP/IP manager 112 is involved in packet reception and transmission of the display apparatus 100, that is, packet delivery from a source to a destination. The TCP/IP manager 112 classifies received packets according to appropriate protocols and outputs the classified packets to the service delivery manager 113, the service discovery manager 120, the service control manager 119, and the metadata manager 122.

The service delivery manager 113 controls received service data. For example, when controlling real-time streaming data, the service delivery manager 113 may use the Real-time Transport Protocol/Real-time Transport Control Protocol (RTP/RTCP).

If real-time streaming data is transmitted over RTP/RTCP, the service delivery manager 113 parses the received real-time streaming data using RTP and outputs the parsed real-time streaming data to the DEMUX 115 or stores the parsed real-time streaming data in the SI & metadata DB 121 under the control of the service manager 123. In addition, the service delivery manager 113 feeds back network reception information to a server that provides the real-time streaming data service using RTCP.

The DEMUX 115 demultiplexes a received packet into audio data, video data and PSI data and outputs the audio data, video data and PSI data to the audio decoder 116, the video decoder 117, and the PSI & (PSIP and/or SI) decoder 114, respectively.

The PSI & (PSIP and/or SI) decoder 114 decodes SI such as PSI. More specifically, the PSI & (PSIP and/or SI) decoder 114 decodes PSI sections, PSIP sections or SI sections received from the DEMUX 115.

The PSI & (PSIP and/or SI) decoder 114 constructs an SI DB by decoding the received sections and stores the SI DB in the SI & metadata DB 121.

The audio decoder 116 and the video decoder 117 decode the audio data and the video data received from the DEMUX 115 and output the decoded audio and video data to a user through the display A/V and OSD module 118.

The UI manager 124 and the service manager 123 manage the overall state of the display apparatus 100, provide UIs, and manage other managers.

For example, the UI manager 124 provides a Graphical User Interface (GUI) in the form of an OSD and performs a reception operation corresponding to a key input received from the user. For example, upon receipt of a key input signal regarding channel selection from the user, the UI manager 124 transmits the key input signal to the service manager 123.

The service manager 123 controls managers associated with services, such as the service delivery manager 113, the service discovery manager 120, the service control manager 119, and the metadata manager 122.

The service manager 123 also makes a channel map and selects a channel using the channel map according to the key input signal received from the UI manager 124.

And, the service manager 123 sets the audio/video Packet ID (PID) of the selected channel based on SI about the channel received from the PSI & (PSIP and/or SI) decoder 114.

The service discovery manager 120 provides information necessary to select an SP that provides a service. Upon receipt of a channel selection signal from the service manager 123, the service discovery manager 120 detects a service based on the channel selection signal.

The service control manager 119 takes charge of selecting and control services. For example, if a user selects live broadcasting, like a conventional broadcasting service, the service control manager selects and controls the service using Internet Group Management Protocol (IGMP) or Real-Time Streaming Protocol (RTSP). If the user selects Video on Demand (VoD), the service control manager 119 selects and controls the service.

The RTSP supports trick mode for real-time streaming. Further, the service control manager 119 may initialize and manage a session through an IP Multimedia Control (IMC) gateway using IP Multimedia Subsystem (IMS) and Session Initiation Protocol (SIP). The protocols are given by way of example and thus other protocols are also applicable according to other embodiments.

The metadata manager 122 manages metadata related to services and stores the metadata in the SI & metadata DB 121.

The SI & metadata DB 121 stores the SI decoded by the PSI & (PSIP and/or SI) decoder 114, the metadata managed by the metadata manager 122, and the information required to select an SP, received from the service discovery manager 120. The SI & metadata DB 121 may store setup data for the system.

The SI & metadata DB 121 may be constructed in a Non-Volatile RAM (NVRAM) or a flash memory.

An IMS gateway 125 is a gateway equipped with functions needed to access IMS-based IPTV services.

Figure 5:
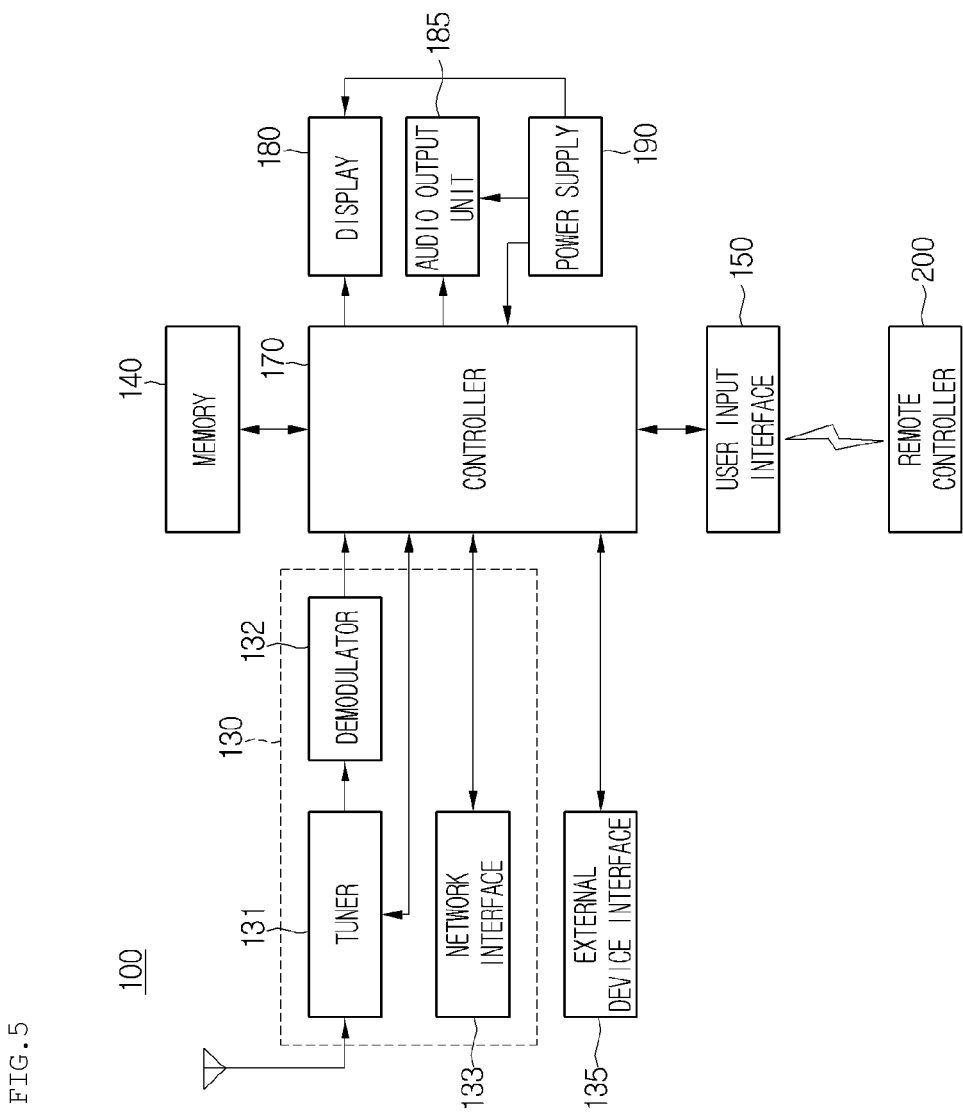
FIG. 5 is a block view showing the configuration of the display apparatus according to another embodiment of the invention.

FIG. 5 is a detailed block diagram of the display apparatus according to another embodiment of the present invention.

Referring to FIG. 5, the display apparatus 100 includes a broadcasting receiver 130, an external device interface 135, a memory 140, a user input interface 150, a controller 170, a display 180, an audio output unit 185 and a power supply 190. The broadcasting receiver 130 may include a tuner 131, a demodulator 132 and a network interface 133.

The tuner 131 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband A/V signal.

For example, if the selected RF broadcast signal is a digital broadcast signal, the tuner 131 downconverts the selected RF broadcast signal into a digital IF signal DIF. On the other hand, if the selected RF broadcast signal is an analog broadcast signal, the tuner 131 downconverts the selected RF broadcast signal into an analog baseband A/V signal, CVBS/SIF.

That is, the tuner 131 may be a hybrid tuner capable of processing not only digital broadcast signals but also analog broadcast signals. The analog baseband A/V signal CVBS/SIF may be directly input to the controller 170.

The tuner 131 may be capable of receiving RF broadcast signals from an Advanced Television Systems Committee (ATSC) single-carrier system or from a Digital Video Broadcasting (DVB) multi-carrier system.

The tuner 131 may sequentially select a number of RF broadcast signals corresponding to all broadcast channels previously stored in the display apparatus 100 by a channel add function from a plurality of RF signals received through the antenna and may downconvert the selected RF broadcast signals into IF signals or baseband A/V signals.

The demodulator 132 receives the digital IF signal DIF from the tuner 131 and demodulates the digital IF signal DIF. For example, if the digital IF signal DIF is an ATSC signal, the demodulator 132 may perform 8-Vestigal SideBand (VSB) demodulation on the digital IF signal DIF.

The demodulator 132 may also perform channel decoding. For channel decoding, the demodulator 132 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 132 performs Coded Orthogonal Frequency Division Multiple Access (COFDMA) demodulation upon the digital IF signal DIF.

The demodulator 132 may also perform channel decoding. For channel decoding, the demodulator 132 may include a convolution decoder (not shown), a de-interleaver (not shown), and a Reed-Solomon decoder (not shown) so as to perform convolution decoding, de-interleaving, and Reed-Solomon decoding.

The demodulator 132 may perform demodulation and channel decoding on the digital IF signal DIF, thereby obtaining a stream signal TS. The stream signal TS may be a signal in which a video signal, an audio signal and a data signal are multiplexed.

For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 132 may include an ATSC demodulator and a DVB demodulator.

The stream signal TS may be input to the controller 170 and thus subjected to demultiplexing and A/V signal processing.

The processed video and audio signals are output to the display 180 and the audio output unit 185, respectively.

The external device interface 135 may serve as an interface between an external device and the display apparatus 100. For interfacing, the external device interface 135 may include an A/V Input/Output (I/O) unit (not shown) and/or a wireless communication module (not shown).

The external device interface 135 may be connected to an external device such as a Digital Versatile Disk (DVD) player, a Blu-ray player, a game console, a camera, a camcorder, or a computer (e.g., a laptop computer), wirelessly or by wire.

Then, the external device interface 135 externally receives video, audio, and/or data signals from the external device and transmits the received input signals to the controller 170. In addition, the external device interface 135 may output video, audio, and data signals processed by the controller 170 to the external device.

The A/V I/O unit of the external device interface 135 may include a Universal Serial Bus (USB) port, a Composite Video Banking Sync (CUBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 133 serves as an interface between the display apparatus 100 and a wired/wireless network such as the Internet. The network interface 133 may include an Ethernet port for connection to a wired network. The wireless communication module of the external signal I/O unit 128 may wirelessly access the Internet. For connection to wireless networks, the network interface 133 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 133 may transmit data to or receive data from another user or electronic device over a connected network or another network linked to the connected network.

Especially, the network interface 133 may transmit data stored in the display apparatus 100 to a user or electronic device selected from among users or electronic devices pre-registered with the display apparatus 100.

The network interface 133 may access a specific Web page over a connected network or another network linked to the connected network. That is, the network interface 133 may access a specific Web page over a network and transmit or receive data to or from a server.

Additionally, the network interface 133 may receive content or data from a CP or an NP. Specifically, the network interface 133 may receive content such as movies, advertisements, games, VoD files, and broadcast signals, and information related to the content from a CP or an NP.

Also, the network interface 133 may receive update information about firmware and update files of the firmware from the NP. The network interface 133 may transmit data over the Internet or to the CP or the NP.

The network interface 133 may selectively receive a desired application among open applications over a network.

The memory 140 may store software for operation of the display apparatus 100, for example, various programs necessary for the controller 170 to process and control signals, and may also store processed video, audio and data signals.

The memory 140 may temporarily store a video, audio and/or data signal received from the external device interface 135 or the network interface 133. The memory 140 may store information about broadcast channels by the channel-add function.

The memory 140 may store applications or a list of applications received from the external device interface 135 or the network interface 133.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory.

The display apparatus 100 may reproduce content stored in the memory 140 (e.g. video files, still image files, music files, text files, and application files) to the user.

The user input interface 150 transmits a signal received from the user to the controller 170 or transmits a signal received from the controller 170 to the user. For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

Also, the user input interface 150 may provide the controller 170 with user input signals or control signals received from local keys (not shown), such as inputs of a power key, a channel key, and a volume key, and setting values.

For example, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 131, the demodulator 132, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 5, the controller 170 may include a DEMUX and a video processor, which will be described later with reference to FIG. 10.

In addition, the controller 170 may provide overall control to the display apparatus 100. For example, the controller 170 may control the tuner 131 to select an RF broadcast signal corresponding to a user-selected channel or a pre-stored channel.

The controller 170 may control the display apparatus 100 according to a user command received through the user input interface 150 or according to an internal program. Especially the controller 170 may access a network and download an application or application list selected by the user to the display apparatus 100 over the network.

For example, the controller 170 controls the tuner 131 to receive a channel selected according to a specific channel selection command received through the user input interface 150 and processes a video, audio and/or data signal of the selected channel.

The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 131, an external input image received through the external device interface 135, an image received through the network interface 133, or an image stored in the memory 140. The image displayed on the display 180 may be a Two-Dimensional (2D) or Three-Dimensional (3D) still image or moving picture.

The controller 170 may control content playback. The content may include any content stored in the display apparatus 100, received broadcast content, and external input content. The content includes at least one of a broadcast image, an external input image, an audio file, a still image, a Web page, or a text file.

Upon receipt of a go-to-home input, the controller 170 may control display of the home screen on the display 180 in an embodiment of the present invention.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the display apparatus 100. The card objects may further include at least one of a card object representing a list of connected external devices or a card object representing a call-associated list.

The home screen may further include an application menu with at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting on the home screen. The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the display apparatus 100, the controller 170 may control focusing-on or shift of a call-related card object among the plurality of card objects.

If an application view menu item is selected, the controller 170 may control display of applications or a list of applications that are available in the display apparatus or downloadable from an external network.

The controller 170 may control installation and execution of an application downloaded from the external network along with various UIs. Also, the controller 170 may control display of an image related to the executed application on the display 180, upon user selection.

The display apparatus 100 may further include a channel browsing processor (not shown) for generating thumbnail images corresponding to channel signals or external input signals.

The channel browsing processor may extract some of the video frames of each of stream signals TS received from the demodulator 132 or stream signals received from the external device interface 135 and display the extracted video frames on the display 180 as thumbnail images.

The thumbnail images may be directly output to the controller 170 or may be output after being encoded. Also, it is possible to encode the thumbnail images into a stream and output the stream to the controller 170.

The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display. The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

The display apparatus 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the display apparatus 100. Particularly, the power supply 190 may supply power to the controller 170, the display 180, and the audio output unit 185, which may be implemented as a System On Chip (SOC).

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the display apparatus 100 illustrated in FIG. 5 is purely exemplary. Depending upon the specifications of the display apparatus 100 in actual implementation, the components of the display apparatus 100 may be combined or omitted or new components may be added.

That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 5, the display apparatus 100 may be configured so as to receive and playback video content through the network interface 133 or the external device interface 135, without the tuner 100 and the demodulator 132.

The display apparatus 100 may be separated to an image processing apparatus (for example, a set-top box) for receiving a broadcasting signal or contents according to various network services and a contents player for playing the contents from the image processing apparatus.

In this case, a method for providing a network service according to the embodiment of the present invention is performed by one of the image processing apparatus such as the set-top box and contents player which includes the display 180 and the audio output unit 185.

Figure 6:
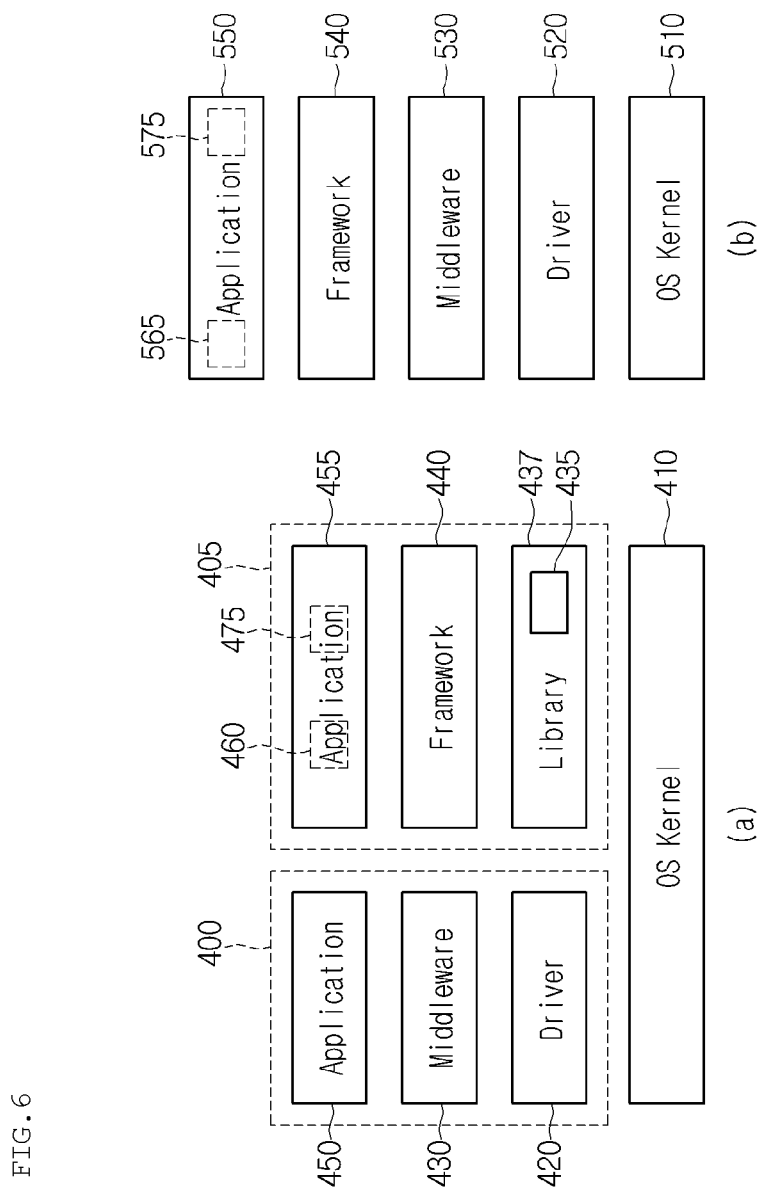
FIG. 6 shows embodiments for a platform architecture of the display apparatus.

FIG. 6 illustrates platform architecture for the display apparatus, and the platform for the display apparatus 100 may have OS-based software to implement the above-described various operations according to an embodiment of the present invention.

Referring to FIG. 6(a), a platform for the display apparatus 100 is a separate type. The platform may be designed separately as a legacy system platform 400 and a smart system platform 405.

An OS kernel 410 may be shared between the legacy system platform 400 and the smart system platform 405. The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is the core of an operating system. When the display apparatus is driven, the OS kernel 410 may be responsible for operation of at least one of hardware drivers, security protection for hardware and processors in the display apparatus, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver.

The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as Unix (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450.

For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the display apparatus.

The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver (not shown) of the OS kernel 410 may operate.

The binder driver and the runtime 437 may connect Java applications to C-based libraries. The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange.

The framework 440 may include supporting programs and programs for interconnecting different software components. For example, the framework 440 may include an activity manager related to activities of applications, a notification manager, and a CP for abstracting common information between applications.

The application layer 455 on top of the framework 440 includes a variety of programs that are executed and displayed in the display apparatus. The application layer 455 may include, for example, a core application that is a suit having at least one solution of e-mail, Short Message Service (SMS), calendar, map, or browser.

This framework 440 or the application layer 455 may be written in Java.

In the application layer 455, applications may be categorized into user-undeletable applications 465 stored in the display apparatus 100 that cannot be modified and user-installable or user-deletable applications 475 that are downloaded from an external device or a network and stored in the display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 6 (b), a platform for the display apparatus 100 is an integrated type. The integrated platform may include an OS kernel 510, a driver 520, middleware 530, a framework 540, and an application layer 550.

Compared to the separate-type platform illustrated in FIG. 6 (a), the integrated-type platform illustrated in FIG. 6 (b) is characterized by the absence of the library 435 and the application layer 550 being an integrated layer. The driver 520 and the framework 540 correspond to the driver 420 and the framework 440 of FIG. 6 (a), respectively.

The platforms illustrated in FIGS. 6 (a) and 6 (b) may be general-purpose ones that can be implemented in many other electronic devices as well as in display apparatuses. The platforms may be stored or loaded in the memory 140 or the controller 170 illustrated in FIG. 5, or any other processor (not shown).

Otherwise, the platforms may be stored or loaded in SI & metadata DataBase (DB) 121, a User Interface (UI) manager 124, or a service manager 123 illustrated in FIG. 4, or any other application processor (not shown) may be included for running an application.

Figure 7:
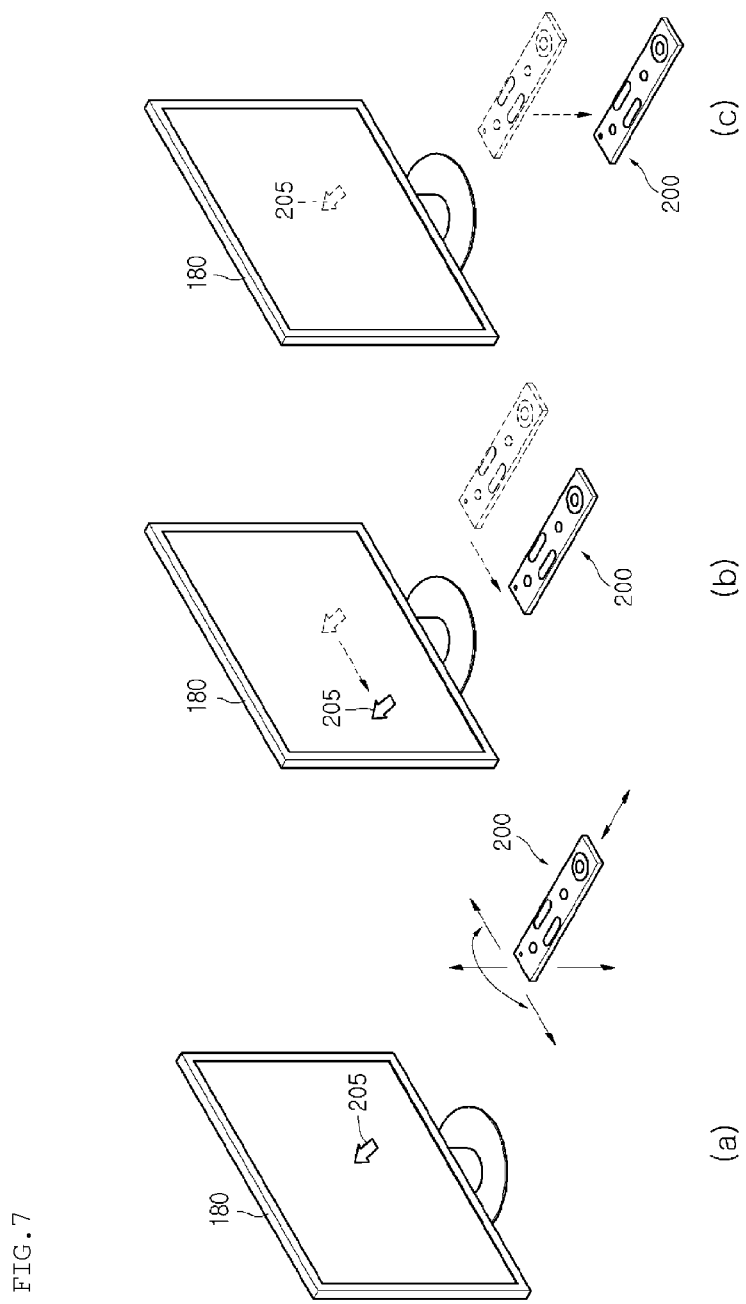
FIG. 7A to 7C show an embodiment for a method controlling an operation of the display apparatus using a remote controller.

FIG. 7 illustrates a method for controlling either of the image display apparatuses using a remote controller according to an embodiment of the present invention.

FIG. 7(a) illustrates a pointer 205 representing movement of the remote controller 200 displayed on the display 180.

The user may move or rotate the remote controller 200 up and down, side to side (FIG. 7(b)), and back and forth (FIG. 7(c)). Since the pointer 205 moves in accordance with the movement of the remote controller 200, the remote controller 200 may be referred to as a pointing device.

Referring to FIG. 7(b), if the user moves the remote controller 200 to the left, the pointer 205 moves to the left on the display 180. A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 7(c), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

The pointer 205 is an object displayed on the display 180 in correspondence with the movement of the remote controller 200. Therefore, the pointer 205 may have various shapes other than the arrow illustrated in FIG. 7. For example, the pointer 205 may be a dot, a cursor, a prompt, a thick outline, etc. The pointer 205 may be displayed across a plurality of points, such as a line and a surface, as well as at a single point on horizontal and vertical axes.

Figure 8:
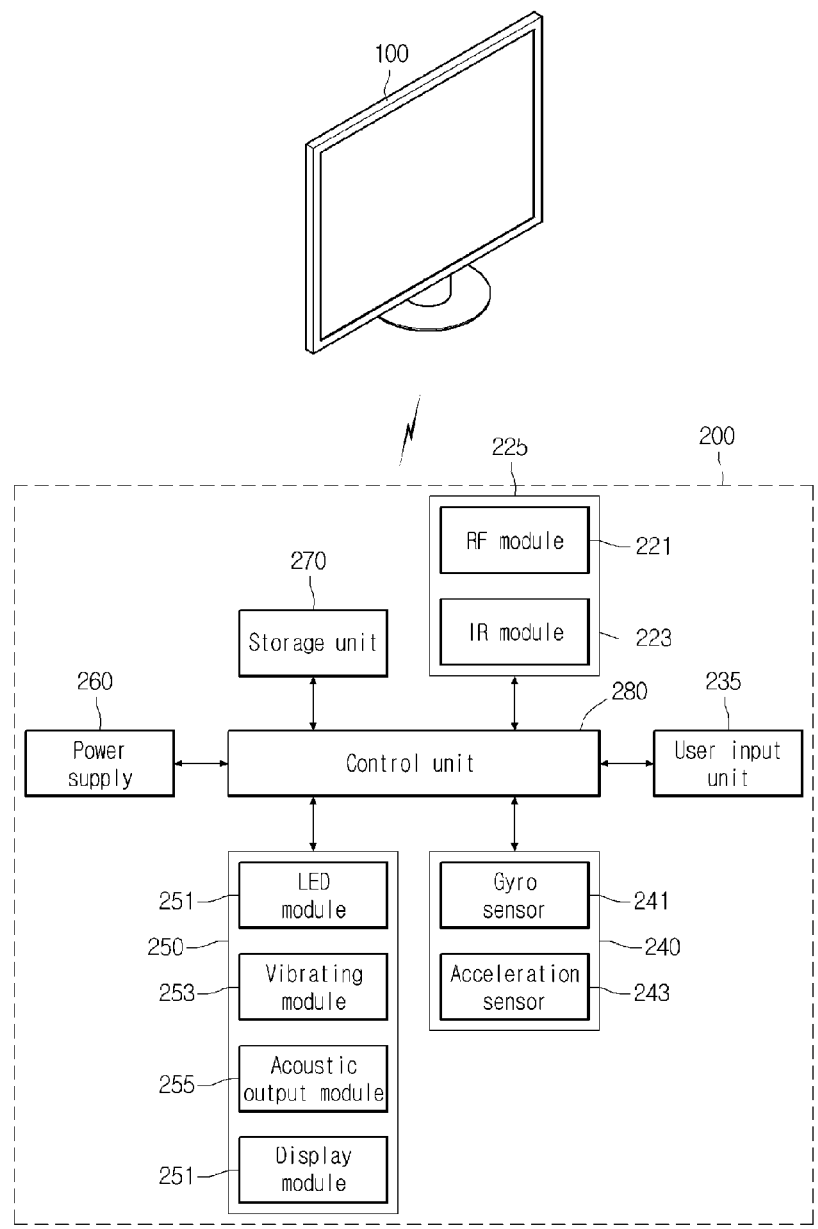
FIG. 8 is a block view showing an embodiment for the configuration of the remote controller.

FIG. 8 is a detailed block diagram of the remote controller in either of the image display apparatuses according to an embodiment of the present invention.

Referring to FIG. 8, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the afore-described image display apparatuses according to the embodiments of the present invention, herein, the image display apparatus 100.

The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The remote controller 200 transmits motion information representing the movement of the remote controller 200 to the image display apparatus 100 through the RF module 221 in this embodiment. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223.

The user input unit 235 may include a keypad, a plurality of buttons, a touchpad and/or a touch screen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touch screen displaying a plurality of soft keys, the user may input various commands to the image display apparatus 100 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 351 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the spatial remote controller 200 in order to save power. The power supply 260 may resume power supply if a predetermined key on the spatial remote controller 200 is manipulated.

The memory 270 may store various types of programs and application data necessary to control or drive the remote controller 200. The spatial remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the spatial remote controller 200, as sensed by the sensor unit 240, to the image display apparatus 100.

Figure 9:
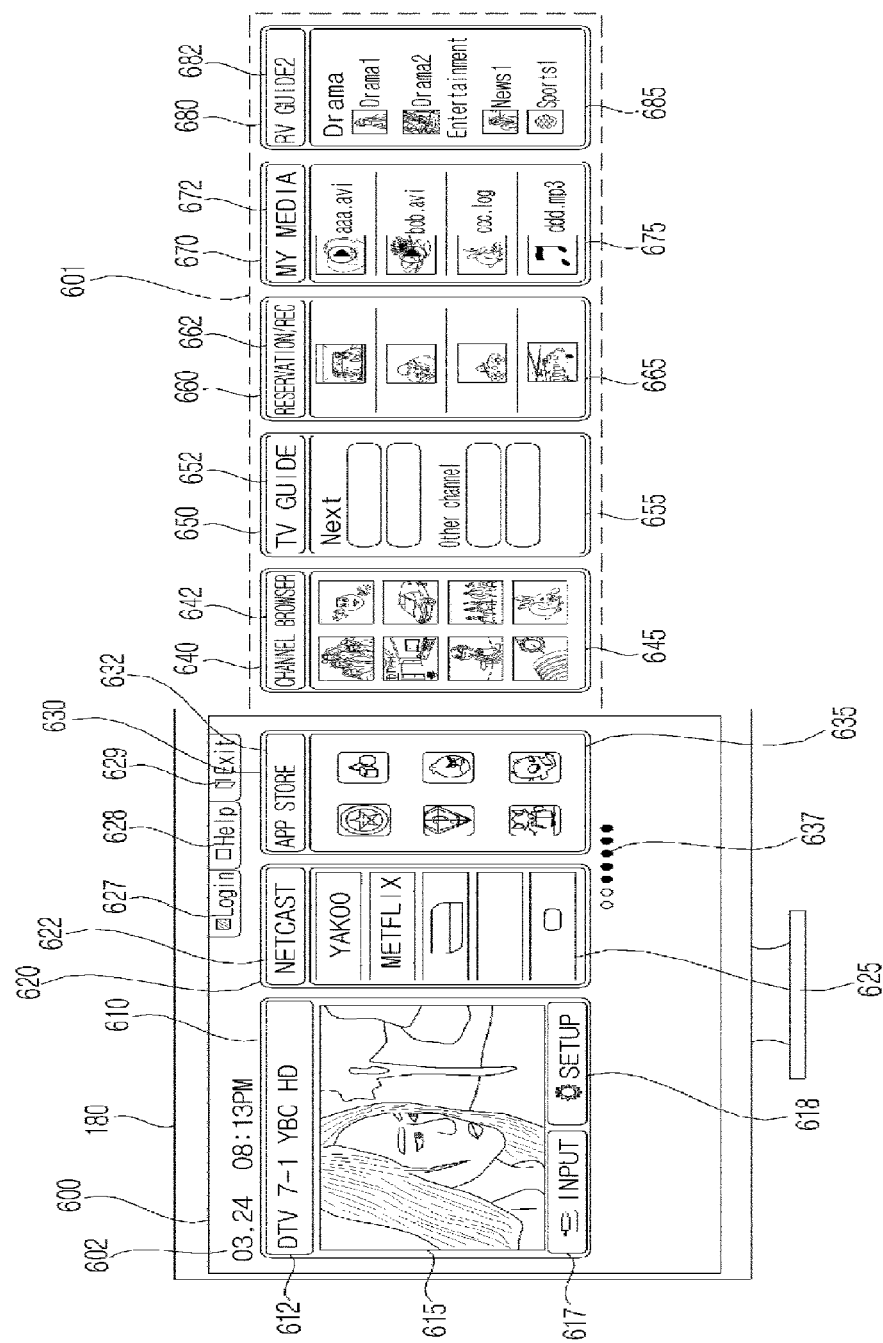
FIG. 9 shows an embodiment for the configuration of a home screen displayed on the display apparatus.

FIG. 9 shows an embodiment for the configuration of a home screen displayed on the display apparatus.

A home screen configuration shown in FIG. 9 may be an example for a basic screen configuration of the display apparatus 100, and such a screen may be set as an initial screen at the time of power on in a power on state or a standby mode, or the basic screen formed by operation of a home key provided in a local key (not shown) or a remote controller.

In FIG. 9, the home screen 600 may include a card object region and the card object region may include a plurality of card objects 610, 620, 630 and the like classified according to the contents source.

FIG. 9 shows the card objects (BROADCAST) 610 displaying the broadcast image, the card objects (NETCAST) 620 representing a Contents Provider (CP) list, and the card objects (APP STORE) 630 representing an application providing list, to be displayed on the display 180.

In addition, FIG. 9 shows the card objects (CHANNEL BROWSER) (640) representing the thumbnail list of the broadcast channel, the card objects (TV GUIDE) (650) representing a broadcast guide list, the card objects (RESERVATION/REC) (660) representing a broadcast reservation list or a recording list, the card objects (MY MEDIA) (670) representing a media list in the display apparatus or the apparatus connected to the display apparatus, the card objects (TV GUIDE2) (680) representing the broadcast guide list and the like, which are the card objects disposed in a hidden area 601 and to be replaced and to be displayed on moving the card objects without being displayed on the display 180.

The card objects (BROADCAST) 610 displaying the broadcast image includes the broadcast image 615 received through a tuner 110 or a network interface unit 130 and the like, the objects 612 representing the relevant information corresponding to the broadcast image, the objects 617 representing external devices, and setup objects 618.

The broadcast image 615 is displayed as the card objects, and enables the user to continually watch the broadcast image by securing its size by locking functions.

It is possible to vary the size of the broadcast image 615 by the user' operation. For example, the size of the corresponding to the broadcast image 615 may be enlarged or reduced by a drag using a pointer 205 of the remote controller 200. The number of the card objects displayed on the display 180 may be two or four instead of three, etc by the enlargement or reduction.

On the other hand, when selecting the broadcast image 615 within the card objects, it is possible to display the corresponding broadcast image as a full screen on the display.

The objects 612 representing the relevant information corresponding to the broadcast image includes a channel number (DTV7-1), a channel name (YBC HD), a broadcast program name (Oh! Lady), 및 broad time (pm 08:00~08:50) and the like. Thereby, the user may intuitively apprehend the information for the broadcast image 615 to be displayed.

When selecting the objects 612 representing the relevant information corresponding to the broadcast image, EPG information related to the objects 612 may be displayed on the display 180.

On the other hand, the objects 602 representing date (03.24), day (THU), and the current time (pm 08:13) may be displayed on the card objects 610 displaying the broadcast image. Thereby, the user may intuitively apprehend the time information.

The objects 617 representing the external device may represent the external device connected to the display apparatus 100. For example, when selecting the corresponding objects 617, The objects 617 may show the external device list connected to the display apparatus 100.

The setup objects 618 may be used to input various settings for the display apparatus 100 For example, the various settings such as an image setting, an audio setting, an screen setting, an reservation setting, a pointer setting of the remote controller 200, a network setting may be performed.

On the other hand, the card objects (NETCAST) 620 representing the Contents Provider (CP) list may include a card object name (NETCAST) 622 and the contents provider list 625. In FIG. 9, Yakoo, Metflix, weather.com, Picason, My tube and the like as the contents provider within the contents provider list 625 are illustrated, but it is possible to variously set.

When selecting the card object name 622, the corresponding card object 620 may be displayed as the full screen on the display 180.

On the other hand, when a predetermined contents provider within the contents provider list 625 is selected, the screen including the contents list provided by the corresponding contents provider may be displayed on the display 180.

The card objects 630 representing the application providing list may include the card object name (APP STORE) 632 and an application list 635. The application list 635 may be the list classified and aligned according to items within the application store. In FIG. 9, the terms is aligned as most popular (HOT), newest (New) and the like, but not limited thereto, various examples may be achieved.

When selecting the card object name 632, the corresponding card object 630 may be displayed as the full screen on the display 180.

On the other hand, when selecting the predetermined application item within the application list 635, the screen providing the information for the corresponding application may be displayed on the display 180.

A log-in term 627, a help term 628, a exit term 629 may be displayed on a top of the card objects 620, 630.

The login term 627 may be used when log-ining on networks connected with application stores and the display apparatus. The help term 628 may be used for help utilization when operating the display apparatus 100. The exit term 629 may be used when trying the exit from the corresponding home screen. At this time, the broadcast image may be displayed as the full screen.

The objects 637 representing the number of the whole card objects may be on a bottom of the card objects 620, 630. The objects may represent the number of the card objects displayed on the display 180 among the whole card objects as well as the number of the whole card objects.

On the other hand, the card objects 640 representing the thumbnail list of the broadcast channel may includes the card object name (CHANNEL BROWSER) 642, and the thumbnail list 645 of the broadcast channel. In FIG. 9, the broadcast channels to be received sequentially are displayed as the thumbnail image, but limited thereto and video is also available. The thumbnail list may include the thumbnail image and the channel information of the corresponding channel. Thereby, the user may intuitively apprehend the content of the corresponding channel.

The thumb image may be the thumbnail image for favorite channels registered in advance by the user or the thumbnail image for the post or previous channel of the broadcast image 615 within the card objects 610. Meanwhile, FIG. 9 shows eight thumbnail images, but various settings are possible. Further, the thumbnail images within the thumbnail list may be updated.

When selecting the card object name 642, the corresponding card object 640 may be displayed as the full screen on the display 180. That is, the content for the thumbnail list may be displayed on the display 180.

On the other hand, when selecting the predetermined thumbnail image within the thumbnail 645 of the broadcast, the broadcast image corresponding to the corresponding thumbnail image may be displayed on the display 180.

The card objects 650 representing the broadcast guide list may include the card object name (TV GUIDE) 652 and the broadcast guide list 655. The broadcast guide list 655 may be the broadcast program after the broadcast image 615 within the card object 610, or the list for the broadcast image of any other channel, but is not limited thereto, and various examples are available.

Meanwhile, When selecting the card object name 652, the corresponding card object 650 may be displayed as the full screen on the display 180.

On the other hand, when selecting the predetermined broadcast item within the broadcast guide list 655, the broadcast image corresponding to the corresponding broadcast item is displayed on the display 180, or the broadcast information corresponding to the corresponding broadcast item may be displayed on the display.

The card object 660 representing the broadcast reservation list or the recording list may include the card object name (RESERVATION/REC) 662, and the broadcast reservation list or the recording list 665. The broadcast reservation list or the recording list 665 may be the list including the broadcast item reserved in advance by the user or the broadcast item recorded according to the reserved item. In FIG. 9, the thumbnail images are configured according to the corresponding items, but various examples are available.

Meanwhile, When selecting the card object name 662, the corresponding card object 660 may be displayed as the full screen on the display 180.

On the other hand, when selecting the broadcast item reserved in advance within the broadcast reservation list or the recording list 665, or the recorded broadcast item, the broadcast information for the corresponding broadcast, or the recorded broadcast image may be displayed on the display 180.

The card objects 670 representing the media list may include the card object name (MY MEDIA) 672 and the media list 675. The media list 675 may be the media list within the display apparatus 100 or the device connected to the display apparatus 100. FIG. 9 shows video, still image, audio and the like, but various examples such as other text document, electronic book and the like are available.

Meanwhile, When selecting the card object name 672, the corresponding card object 670 may be displayed as the full screen on the display 180.

On the other hand, when selecting the predetermined media item within the application list 675, the corresponding media may be performed and the screen corresponding to the corresponding media may be displayed on the display 180.

The card objects (TV GUIDE2) 680 representing the broadcast guide list may include the card object name (TV GUIDE) 682 and the broadcast guide list 685. The broadcast guide list 685 may be the guide list according to the broadcast type. In FIG. 9, entertainment is classified as drama, news or sports to show the list according to the broadcast type, but various settings are available. That is, the list may be the broadcast guide list according to the broadcast type such as drama, movies, news, sports, animation and the like. Thereby, the user may check the guide list classified according to the genre.

When selecting the card object name 682, the corresponding card object 680 may be displayed as the full screen on the display 180.

On the other hand, when selecting the predetermined broadcast item within the broadcast guide list 685, the screen corresponding to the corresponding broadcast image may be displayed on the display 180.

The card objects 620,630 displayed on the display 180, and the card objects 640, 650, 660, 670, 680 positioned at the hidden area without being displayed on the display 180 may be replaced each other by moving input of the card object.

That is, at least one among the card objects 620, 630 displayed on the display 180 may be moved into the hidden area 601, and at least one among the card objects 640, 650, 660, 670, 680 positioned at the hidden area may be displayed on the display 180.

Meanwhile, the home screen 600 of the image apparatus 100 further includes the software upgrade, and the information related to the software upgrade.

Hereinafter, in FIGS. 10 to 12, the service providing/receiving method according to the invention will be described as follows.

Figure 10:
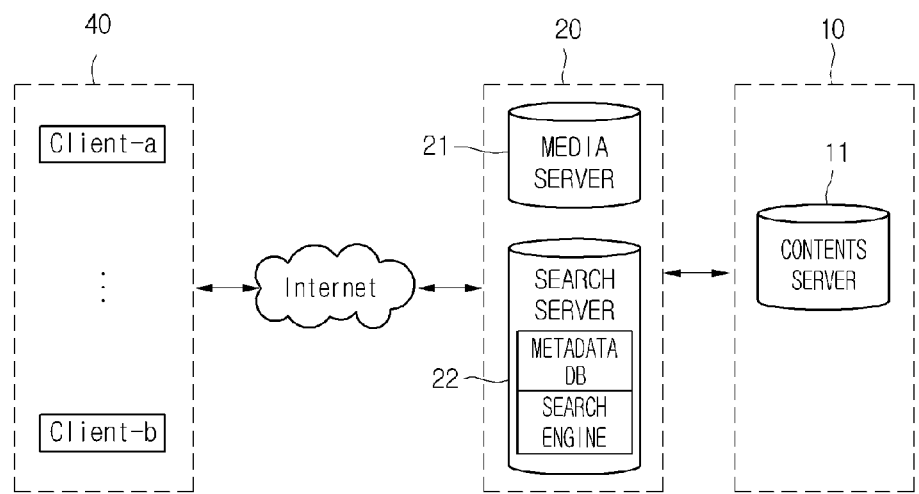
FIG. 10 schematically shows the configuration for a service providing/receiving system according to the present invention.

FIG. 10 schematically shows the configuration for a service providing/receiving system according to the present invention.

The service providing/receiving system according to the present invention includes the Content Provider (CP) 10, the Service Provider (SP) 20, Network Provider (NP) (30) and HNED (40).

The Content Provider (CP) 10 includes a contents server 11, and the contents server 11 may provide at least one service of Internet phone service, video on demand (VOD) service, web album service, social networking service (SNS), location-based service (LBS), map service, Web search service, application search service, streaming transport service. The contents server 11 according to the invention may transmit the metadata for at least one service among a plurality of services described above to the media server 21 included in the service provider 20.

Further, the contents server 11 according to the invention receives URL information, that is, an unique address for a specific metadata to store in the database (not shown) included in the contents server 11. Further, an icon image related to the specific metadata, and coordinate information related to the icon image may be received. The coordinate information as the coordinate information for the specific region among a UI skin to be described later may insert the icon image into the specific region corresponding to the coordinate information.

The icon image is the icon image implicitly displaying the service provided by the contents provider, or a mark image or a title bar identifying the contents provider 10 providing the service.

The input coordinate information and the icon image may be stored into the database (not shown) included in the contents server 11 The contents server 11 according to the invention may transmit the metadata and the icon image related to the metadata for at least one service among a plurality of services described above to the media server 21 included in the service provider 20.

The Service ProviderSP 20 includes a media sever 21 and a search server 22.

The media sever 21 service-packages various contents provided by the contents server 11 of the content provider 10 to provide to the client 40. The service provided by the contents server 11 may be at least one service of Internet phone service, video on demand (VOD) service, web album service, social networking service (SNS), location-based service (LBS), map service, Web search service, application search service, streaming transport service. On the other hand, the media server 21 according to the invention may receive the metadata related to at least one service provided from the contents server 11.

The media server 21 converts the received metadata into the metadata of XML format, and may provide the converted metadata to the client 49. Further, when receiving the icon image related to the received metadata, the received icon image may be provided to the client 40.

Further, the media server 21 may transmit the metadata of the converted XML format to the search server 22.

Here, the metadata, which is the structured data about data, is data that describe other data and is also known as attribute information. The attribute information is data given for the content according to certain rules to effectively search and use information under the search among large amounts of information. The attribute information includes the location and contents of the contents, information about an author, right conditions, use conditions, use histories, etc.

Here, the metadata may include RSS (Really Simple Syndication) feed, and the metadata of the converted XML format may include the information for the URL of the metadata. Further, when receiving together the icon image related to the metadata, the metadata of the converted XML format may include the coordinate information for the specific region in which the icon image is inserted into the UI skin.

Meanwhile, The XML format as a type of document format takes human-readable text format to enable more easy access while ensuring interoperability. The XML format may be used to replace a delimeter format, and changes or application by an information maker are available. Therefore, The XML format has high recognition rate in the system as well as the utilization higher than those of the delimeter format.

The search server 11 includes metadata DB and a search engine. The metadata DB registers the metadata of the converted XML format transmitted from the media server 21. The search engine collects and classifies the metadata of the XML format stored in the metadata DB, produces a metadata list using the metadata of the collected and classified XML format in response to a search request command when receiving the search request command from the client 41, and therefore, provides the produced metadata list to the client 41.

The client 40 connects to the media server 21 of the service provider 20 through the network to receive the metadata of the XML format from the media server 21, produces the UI skin representing at least one service provided from a plurality of contents provider based on the metadata of the received XML format, and therefore, may display the produced UI skin on the display. Further, the displayed UI skin is selected, and the service corresponding to the selected UI skin is requested to receive the corresponding service from the contents server 11 of the contents provider 10.

On the other hand, when connecting to the media server 21 of the service provider 20 through the network and receiving the icon image related to the metadata of XML format from the media server 21, the client 40 updates the received icon image to the UI skin to produce new UI skin by determining whether the icon image included in pre-stored UI skin is present and an identity is present. The detailed content about this will be described later.

Further, the client 40 connects to the search server 22 of the service provider 20 through the network to receive the metadata list from the search server 22, produces the search UI skin based on the metadata list, and may display the produced search UI skin on the display.

Figure 11:
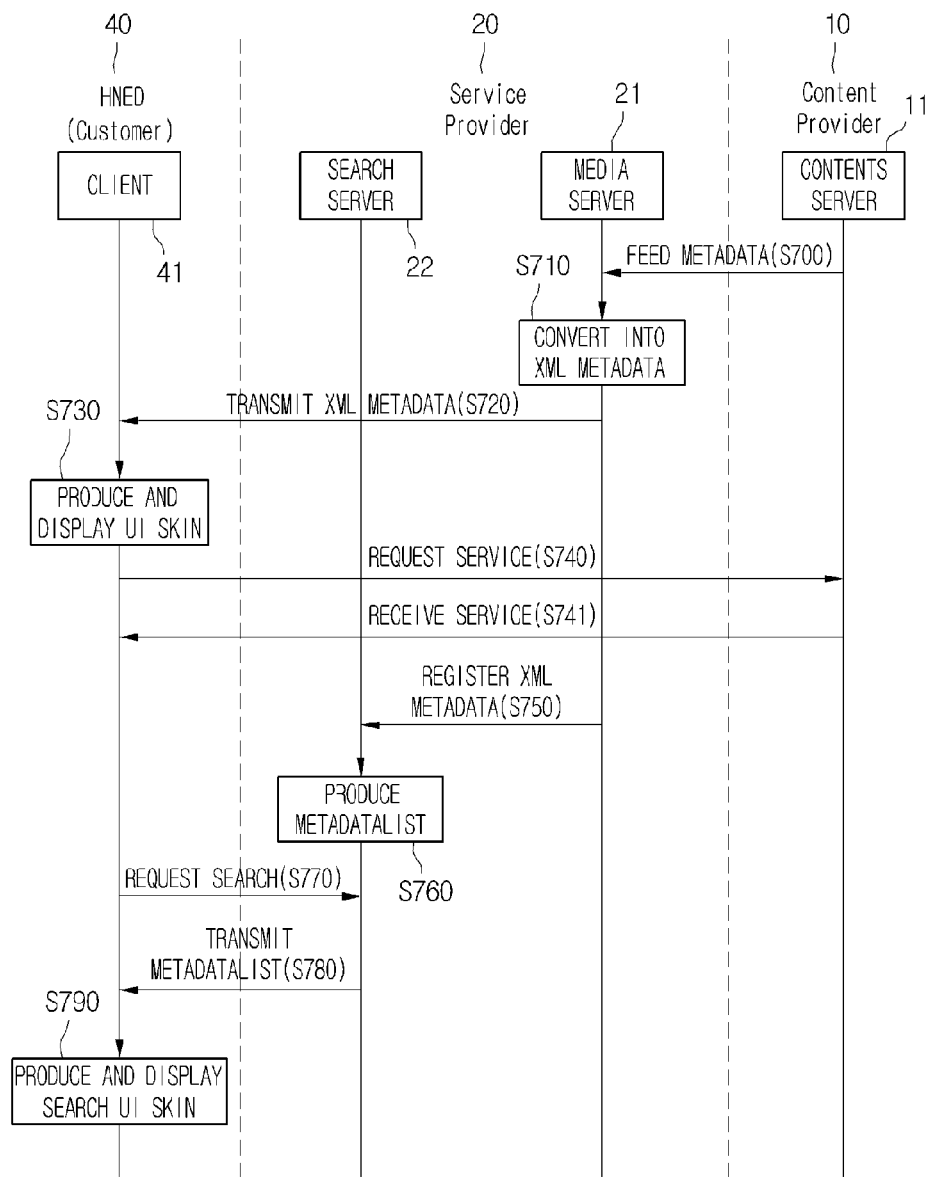
FIG. 11 is a flow chart for explaining a service providing/receiving method according to an embodiment of the invention.

FIG. 11 is a flow chart for explaining a service providing/receiving method according to an embodiment of the invention. FIGS. 12 and 13 shows an example of the screen displaying UI skin produced using metadata in the service providing system according to the invention.

In FIG. 11, the contents server 11 transmits the metadata for at least any one of service among a plurality of services available to the media server 21 included in the service provider 20. The media server 21 converts the received metadata into the metadata of the XML format S710). The media server 21 transmits the metadata of the XML format to the client 41 (S720).

The client 41 receives the metadata of the XML format transmitted from the media server 21 through the network interface 133.

The controller 170 of the client 41 produces the UI skin representing at least one of service provided from a plurality of contents provider based on the metadata of the received XML format.

The UI skin representing the contents provider 10 related to the metadata of the received XML format among a plurality of UI skin pre-stored in the memory 140, or the service provided by the contents provider 10, using the metadata of the received XML format may be produced. The produced UI skin may be displayed on the display 180 (S730).

Figure 12:
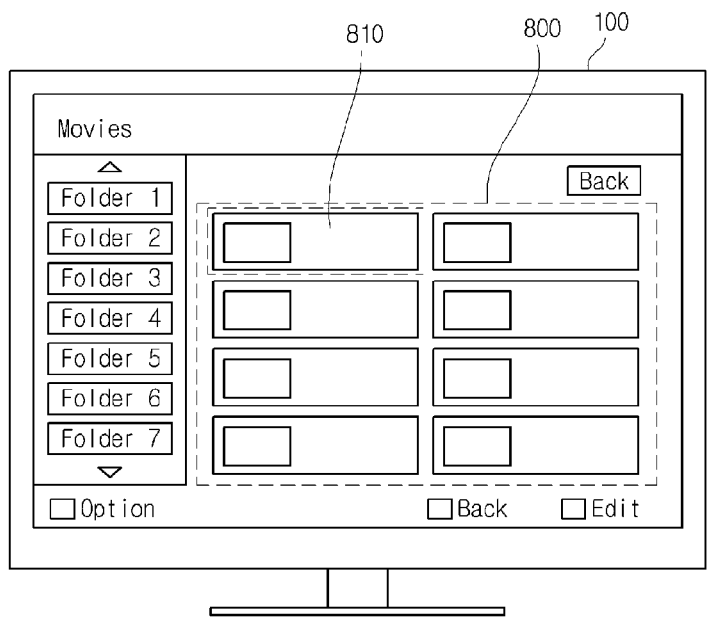
FIGS. 12 and 13 shows an example of the screen displaying UI skin produced using metadata in the service providing system according to the invention.
Figure 13:
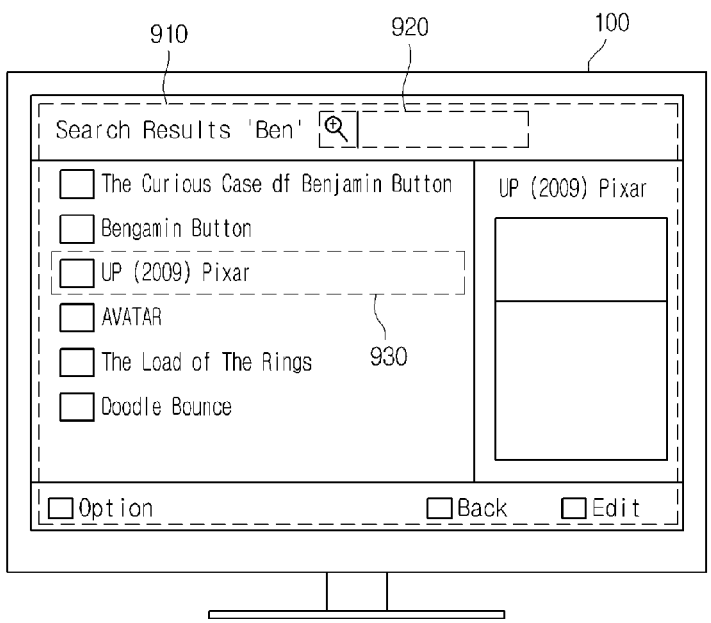

As shown in FIG. 12, the plurality of UI skin lists 800 each representing the service provided by the plurality of content provider 10 or the contents provider 10 are produced through the metadata of the XML format transmitted from the media server 21, and may be displayed on the display. When selecting any one of UI skin 810 among the produced plurality of UI skin lists 800 by the user, the request command for the service corresponding to the selected UI skin is transmitted to the contents server 11 of the contents provider 10 (S740). The contents server 11 may provide the corresponding service to the client 41 in corresponding to the service request command received from the client 41 (S741).

Meanwhile, the media server 21 transmits the metadata of the XML format to the metadata DB of the search server 22 to register the metadata of the XML format to the metadata DB (S750). The search engine of the search server 22 collects and classifies the metadata of the XML format stored in the metadata DB, and produces the metadata list using the metadata of the collected and classified XML format (S760).

When the client 42 transmits the search request command to the search server 22 (S770), the search engine of the search server 22 provides the produced metadatalist to the client 41 (S780), produces the search UI skin based on the provided metadatalist, and displays the produced search UI skin on the display 180 (S790).

As shown in FIG. 13, the search UI skin 910 may be displayed through the display 180 of the display apparatus 100, and the user performs the search through a search input window 920 included in the displayed search UI skin 910 to display the UI skin 930 related to the metadata of the XML format included in the metadatalist as the search result.

Figure 14:
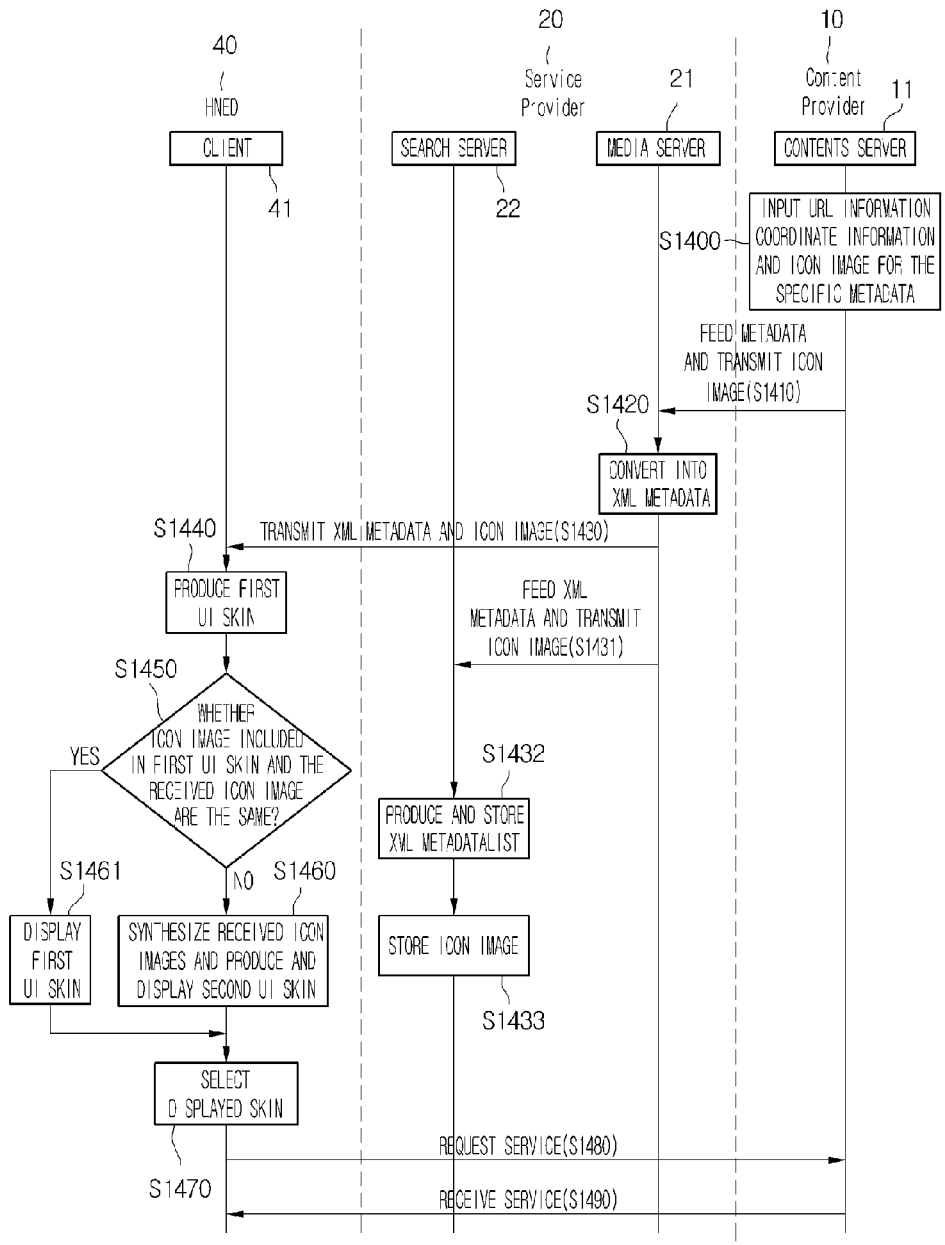
FIG. 14 is a flow chart for explaining a service providing/receiving method according to another embodiment of the invention.

FIG. 14 is a flow chart for explaining a service providing/receiving method according to another embodiment of the invention. FIGS. 15 to 17 show an example of the screen displaying the UI skin produced using the metadata in the service providing system according to another embodiment of the invention.

In FIG. 14, the contents server 11 receives the unique address, that is, the URL information for the specific metadata, the icon image related to the specific metadata, and the coordinate information for the specific region inserted with the icon image, and the like (S1400).

The input URL information, the icon image and the coordinate information and the like may be stored into the database (not shown) included in the contents server 11

The contents server 11 transmits the metadata for at least any one of service among a plurality of services available and the icon image related to the metadata to the media server 21 included in the service provider (S1410).

The metadata includes the icon image and the coordinate information related to the icon image.

The media server 21 converts the received metadata into the metadata of the XML format (S1420). The media server 21 transmits the metadata of the XML format and the icon image received from the contents server 11 to the client 41 (S1430).

The client 41 receives the metadata of the XML format transmitted from the media server 21 and the icon image through the network interface 133.

The controller 170 of the client 41 reads a first UI skin related to the URL information included in the metadata of the received XML format among a plurality of UI skin pre-stored in the memory 140 (S1440). The read first UI skin may be the UI skin set as basic format when manufacturing a terminal of the client, and in this case, the icon image may not be included in the first UI skin.

In addition, the read first UI skin may also include the icon image related to the service provided by the specific contents provider in the UI skin set in a basic format.

The controller 170 determines whether the icon image included in the read first UI skin is present, when the icon image is included in the first UI skin, it is determined whether the icon image included in the first UI skin and the received icon image are the same to each other Here, whether the icon image included in the first UI skin and the received icon image are the same to each other also includes whether the coordinate information of the icon image included in the first UI skin and the coordinate information of the received icon image are the same to each other as well as whether the icon images are the same to each other.

When the icon image included in the first UI skin and the received icon image are the same to each other, the received icon image is determined as the updated icon image, thereby displaying the pre-stored first UI skin on the display 180 (S1461).

Meanwhile, when the icon image included in the first UI skin and the received icon image are not the same to each other, the first UI skin is determined as the not updated icon image, thereby synthesizing the received icon images instead of the icon image included in the first UI skin, producing a second UI skin, and displaying the produced second UI skin on the display 180 (S1460).

The second UI skin representing at least one of the service provided from a plurality of contents provider is produced based on the metadata of the received XML format. Further, the icon image included in the second UI skin produces the received icon image at the specific region of the first UI skin corresponding to the coordinate information by using the coordinate information included in the metadata of the XML format, thereby producing the second UI skin.

On the other hand, when it is determined by the controller 170 that whether the icon image included in the read first UI skin is present, if the icon image included in the read first UI skin is not present, the received icon image is inserted into the specific region of the first UI skin corresponding to the coordinate information by using the coordinate information included in the metadata of the XML format, thereby producing the second UI skin.

When the user selects the UI skin displayed on the display 180, the request command for the service corresponding to the selected UI skin is transmitted to the contents server 11 of the contents provider 10 (S1480). The contents server 11 may provide the corresponding service to the client 41 in corresponding to the service request command received from the client 41 (S1490).

FIGS. 15A and 15B is an example producing a new UI skin using the metadata of the XML format received from the media sever 21 and the icon image, and displaying the produced UI skin.

As shown In FIG. 15A, a plurality of UI skin lists 1500 each representing the service provided by the plurality of content provider 10 or the contents provider 10 are displayed on the display 180. The plurality of UI skin lists 1500 includes a first UI skin 1510 pre-stored in the memory 140.

The first UI skin 1510 shown in FIG. 15A may be the UI skin set as the basic format when manufacturing the terminal of the client, and in this case, the icon image may not be included in the specific region 1520 of the first UI skin 1510.

On the other hand, when receiving the metadata of the XML format and the icon image related to the metadata of the XML format from the media server 21, as shown in FIG. 15B, the received icon image is inserted into the specific region 1521 of the first UI skin, thereby producing the second UI skin 1511 and displaying on the display 180.

The icon image inserted into the specific region 1521 is the icon image implicitly displaying the service provided by the contents provider 10, or a mark image or a mark image identifying the contents provider 10 providing the service.

FIGS. 16A and 16B is another example producing the new UI skin using the metadata of the XML format received from the media sever 21 and the icon image, and displaying the produced UI skin.

As shown In FIG. 16A, a plurality of UI skin lists 1600 each representing the service provided by the plurality of content provider 10 or the contents provider 10 are displayed on the display 180. The plurality of UI skin lists 1600 includes a first UI skin 1610 pre-stored in the memory 140.

The first UI skin 1610 shown in FIG. 15A may be the UI skin produced using the icon image pre-provided previously, and in this case, the pre-provided icon images may be included in the first specific region 1620 and the second specific region 1630 of the first UI skin 1610.

The mark image identifying the contents provider 10 providing the service may be inserted into the first specific region 1620, and The icon image implicitly displaying the service provided by the contents provider 10 may be inserted into the second specific region 1630.

On the other hand, when receiving the metadata of the XML format and the icon image related to the metadata of the XML format from the media server 21, and if the received icon image is not the same as the icon image pre-provided to the first specific region 1620 and the second specific region 1630 of the first UI skin 1610 shown in FIG. 16A, the received icon image may be inserted.

As shown FIG. 16B, the received icon image is inserted into the first specific region 1621 and the second specific region 1631 to produce the second UI skin 1511, and the produced second UI skin 1610 may be displayed on the display 180.

FIGS. 17A and 17B is another example producing the new UI skin using the metadata of the XML format received from the media sever 21 and the icon image, and displaying the produced UI skin.

As shown FIG. 17A, when selecting any one of the UI skin among the plurality of UI skin list 1500, 1600 of FIGS. 15A and 15B, and 16A and 16B, a first UI skin 1710 concretely representing the service corresponding to the corresponding UI skin is displayed, and a title bar representing the corresponding service is displayed on the specific region of the first UI skin 1710.

The title bar displayed on the specific region 1720 may be the pre-provided icon image.

On the other hand, when receiving the metadata of the XML format and the icon image related to the metadata of the XML format from the media server 21, and if the received icon image, which is the title bar image, is not the same as the title bar image displayed to the specific region 1720 of the first UI skin 1710 shown in FIG. 17A, the received icon image, that is, the title bar may be inserted.

As shown FIG. 17B, the received icon image, that is, the title bar image is inserted into the specific region 1721 of the first UI skin to produce the second UI skin 1711, and the produced second UI skin 1711 may be displayed on the display 180.

The stereoscopic image display method according to above-described disclosure is manufactured with program performing in computer and is stored to the computer-readable recording medium. An example of the computer-readable recording medium is ROM, RAM, CD-ROM, magnetic tape, floppy disk, optical data storage device and the like, and may be also implemented in a type of carrier waves (for example, transmittance through Internet)

The computer-readable recording medium is distributed to the computer system connected to network, and the computer-readable code is stored in a distributed way and may be performed. Further, functional program, code, code segments implementing the method may be easily inferenced by programmer in the art to which the disclosure belongs.

Embodiments of the present invention have an advantage in that a predetermined service is converted into a XML format to provide to a client, thereby properly searching service a user want and receiving.

In addition, although the preferred embodiments of the disclosure are shown and described above, the disclosure is not limited to above-described specific embodiment and is variously modified by one skilled in the art without the gist of the disclosure claimed in the claim, such that the modified embodiment is not to be understood separately from technical ideas or views of the disclosure.

What is claimed is:

1. A method for receiving service, the method comprising:
receiving, by a network interface, metadata of eXtensible Markup Language (XML) format and an icon image which is related to the metadata of the XML format from a service provider, the received metadata including a uniform resource locator (URL) information and a coordinate information;
producing, by a controller, a first user interface (UI) skin related to the URL information among a plurality of UI skins stored in a memory based on the URL information included in the received metadata of the XML format;
determining whether the received icon image and an icon image included in the first UI skin are the same as each other;
displaying, by a display device, the first UI skin when the received icon image and an icon image included in the displayed first UI skin are the same as each other;
replacing the icon image included in the displayed first UI skin to generate a second UI skin; and
displaying the second UI skin on the display device,
wherein in the generating of the second UI skin, the received icon images are synthesized in the specific region of the first UI skin using the coordinate information to generate the second UI skin.

2. The method according to claim 1, further comprising:
requesting the service corresponding to the first UI skin by selecting one of the displayed first UI skin and the second UI skin; and
receiving the service from a contents provider in response to the request.

3. The method according to claim 1, further comprising:
receiving a metadata list from a search server of the service provider;
producing a search UI skin based on the metadata list; and
displaying the search UI skin on the display device.

4. A client for receiving service, the client comprising:
a display device;
a network interface configured to receive metadata of eXtensible Markup Language (XML) format and an icon image which is related to the metadata of the XML format from a service provider, the received metadata including a uniform resource locator (URL) information and a coordinate information; and
a controller configured to:
produce a first user interface (UI) skin related to the URL information among a plurality of UI skins stored in a memory based on the URL information included in the received metadata of the XML format,
determine whether the received icon image and an icon image included in the first UI skin are the same as each other, control the display device to display the first UI skin when the received icon image and an icon image included in the displayed first UI skin are the same as each other, replace the icon image included in the displayed first UI skin to generate a second UI skin, and control the display device to display the second UI skin, wherein in the generating of the second UI skin, the received icon images are synthesized in the specific region of the first UI skin using the coordinate information to produce the second UI skin.

5. The client according to claim 4, wherein, when receiving a service request corresponding to the first UI skin through selection of one of the displayed first UI skin and the second UI skin, the service corresponding to the service request from a contents provider is received through the network interface.

6. The client according to claim 4, wherein, when receiving a search request command, a metadata list is received from the service provider through the network interface, the controller produces a search UI skin based on the received metadata list, and the controller controls the display device to display the search UI skin.

* * * * *